United States Patent [19]
Woods et al.

[11] Patent Number: 5,345,218
[45] Date of Patent: Sep. 6, 1994

[54] FLASHING BRAKE LIGHT SYSTEM

[76] Inventors: Daniel S. Woods, 462 S. Gilbert, Apt. 605, Mesa, Ariz. 85204; Robert Stargiotti, 21104 Hazelbrook Dr., Cupertino, Calif. 95014

[21] Appl. No.: 937,461

[22] Filed: Aug. 31, 1992

[51] Int. Cl.$^5$ ............................................ B60Q 1/44
[52] U.S. Cl. ................................. 340/479; 340/464; 340/472
[58] Field of Search .................. 340/479, 464, 472

[56] References Cited

U.S. PATENT DOCUMENTS

| | | | |
|---|---|---|---|
| 3,460,039 | 8/1969 | Gregory | 340/479 |
| 3,568,146 | 3/1971 | Knez | 340/479 |
| 3,576,527 | 4/1971 | Howard | 340/479 |
| 3,629,820 | 12/1971 | Sakurai | 340/479 |
| 3,665,391 | 5/1972 | Bumpous | 340/479 |
| 3,693,151 | 9/1972 | Hasegawa et al. | 340/479 |
| 3,846,749 | 11/1974 | Curry | 340/479 |
| 3,914,739 | 10/1975 | Caughlin et al. | 340/479 |
| 4,346,365 | 8/1982 | Ingram | 340/479 |
| 4,651,129 | 3/1987 | Wood et al. | 340/479 |
| 4,663,609 | 5/1987 | Rosario | 340/479 |
| 4,956,633 | 9/1990 | Waterson et al. | 340/479 |
| 4,987,405 | 1/1991 | Jakobowski | 340/479 |

*Primary Examiner*—Donnie L. Crosland
*Attorney, Agent, or Firm*—Lowell W. Gresham; Jordan M. Meschkow; Don J. Flickinger

[57] ABSTRACT

A vehicle having left and right lower rear brake lights and a center high-mounted stop lamp (CHMSL) flashes the CHMSL when brakes are initially applied. The lower brake lights do not automatically flash. After a predetermined duration, the CHMSL remains continuously activated until brakes are removed. A semiconductor oscillator circuit is configured to be energized when brakes are applied. It produces an oscillating signal which is responsible for causing the CHMSL to flash. A semiconductor timer circuit is also configured to be energized when brakes are applied. It produces a time out signal which activates a predetermined duration after brakes are applied and which is responsible for causing the CHMSL to remain continuously activated. The outputs of the oscillator and timer circuits are combined at a semiconductor switch which drives the CHMSL.

7 Claims, 2 Drawing Sheets

FLASHING BRAKE LIGHT SYSTEM

TECHNICAL FIELD OF THE INVENTION

The present invention relates generally to the operation of vehicle brake lights. More specifically, the present invention relates to operating vehicle brake lights so that brake lights are automatically flashed.

BACKGROUND OF THE INVENTION

Brake lights represent one of the many important safety features included on a vehicle. Brake lights indicate when a vehicle's brakes are being applied to signal the driver of a following vehicle of a need to slow down to avoid a rear-end collision. However, in spite of the use of brake lights, the incidence of rear-end collisions remains high. To some degree, the high incidence of rear-end collisions is due to a tendency to follow too closely in traffic. But, the high incidence of rear-end collisions is also due to inattention by the following driver, often in combination with following too close.

Accordingly, brake light systems are designed to grab a following driver's attention. To this end, brake lights tend to exhibit the color red and to be relatively bright when compared to other lights which may be located at the rear of a vehicle. In recent years, the size of these lights has increased, and a center high-mounted stop lamp (CHMSL), also called an upper brake light, third brake light, or cyclops light, has been added to the rear of many vehicles for improved visibility from behind and an improved attention-grabbing effect. While such enhancements are widely believed to have improved safety, rear-end collisions still occur far too frequently.

Alternative brake light operating systems which possess still greater attention-grabbing characteristics are known. Such systems often cause brake lights to flash. However, such alternative brake light operating systems suffer from numerous drawbacks and have not gained public acceptance.

For example, many flashing brake light systems cause brake lights to flash excessively. As a result, the flashing lights become a distraction. After being exposed to such excessive flashing for some time, drivers become immune to the attention grabbing effect of a flashing light and its benefits are lost. Worse yet, when placed in traffic with vehicles having normal, non-flashing brake lights, the attention-grabbing effect of the non-flashing brake lights is reduced and overall traffic safety diminishes rather than improves.

In addition, many flashing brake light systems, whether they flash excessively or not, possess other features which compromise rather than improve safety. For example, many of such systems incorporate notoriously unreliable devices, such as relays and flashers having physical contacts, motors, cams, levers, and other mechanical devices. Such devices often have failure modes which prevent the brake lights from working at all, and such devices are often applied to all vehicle brake lights. Consequently, vehicles having such conventional flashing brake light systems can be expected to experience a total failure of brake lights at least once during the useful life of the vehicle. While some incremental safety improvement may be achieved, the improvement is countered by an occasional extremely dangerous total brake light failure.

Furthermore, conventional flashing brake light systems tend to be complex devices. Complex devices are highly disadvantageous for several reasons. They tend to weigh more, be less reliable, and be more expensive than more simple devices. Often times, they are difficult to adapt to a vehicle and are impractical to install in vehicles having normal, non-flashing brake light systems, except at great expense.

SUMMARY OF THE INVENTION

Accordingly, it is an advantage of the present invention that an improved flashing brake light system is provided.

Another advantage of the present invention is that brake lights are flashed in a subtle manner to retain a high attention-grabbing effect and to refrain from significantly decreasing the attention-grabbing effects of non-flashing brake light systems.

Yet another advantage is that the present invention is highly reliable and is configured so that no dangerous failure modes are present should a failure occur.

Another advantage of the present invention is that an inexpensive system is provided which is easily installed in existing vehicles having non-flashing brake light systems.

The above and other advantages of the present invention are carried out in one form by an apparatus for indicating the braking status of a vehicle upon the activation of an input signal. The apparatus includes a semiconductor oscillator circuit. The oscillator circuit has a power terminal adapted to be energized by the input signal. The oscillator circuit is configured to generate an oscillation signal that alternatively exhibits activated and inactivated states so long as the oscillator circuit is energized. The apparatus also includes a semiconductor timer circuit. The timer circuit has a power terminal adapted to be energized by the input signal. The timer circuit is configured to generate a delay signal which becomes activated a predetermined duration after activation of the input signal. Furthermore, the apparatus includes a semiconductor switch. The switch is coupled to the oscillator circuit and to the timer circuit. The switch is configured to switch "on" when either the oscillation signal or the delay signal is activated.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
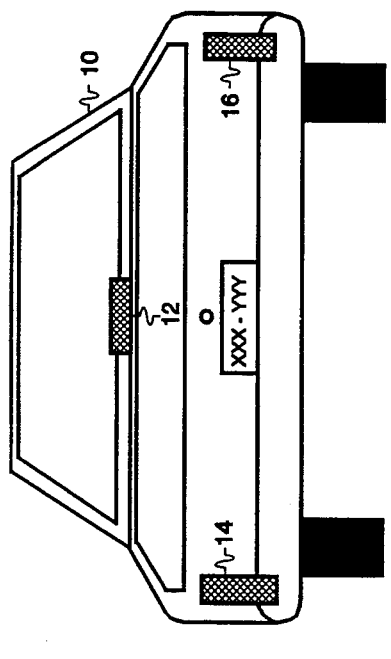
FIG. 1 shows a rear view of a vehicle having a flashing brake light system constructed in accordance with the present invention.

FIG. 1 shows a rear view of a vehicle 10 configured in accordance with the present invention. In particular, vehicle 10 includes a center high-mounted stop lamp (CHMSL) 12 along with left and right lower brake lights 14 and 16, respectively. Lights 12–16 serve as indicators which announce when vehicle brakes are being applied. CHMSL 12 is located above lower lights 14–16. In addition, CHMSL 12 is positioned in the center of vehicle 10 while lower lights 14–16 are positioned at left and right sides, respectively, of vehicle 10. Lower lights 14–16 may also be associated physically and/or electrically in a conventional manner with turn indicators and with other filaments which serve as running lights.

Figure 2:
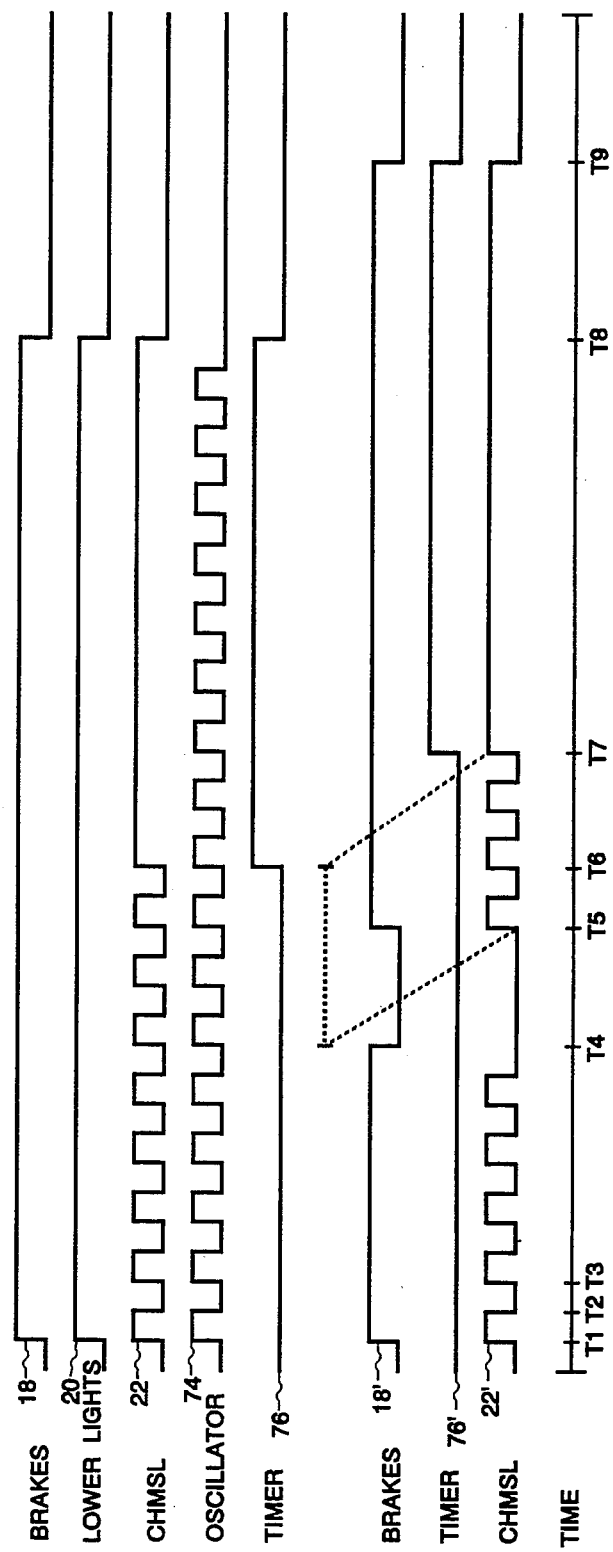
FIG. 2 shows a timing diagram which describes the operation of the present invention.

FIG. 2 shows a timing diagram that describes the operation of lights 12–16. In particular, trace 18 describes an exemplary sequence associated with the application of brakes within vehicle 10. As shown in trace 18, vehicle brakes are applied at a time $T_1$ and remain applied until removed at a time $T_8$. Of course, those skilled in the art will appreciate that the application and removal of brakes are controlled by the driver of vehicle 10 in response to driving conditions. Thus, the sequence shown in trace 18 depicts only one of numerous possible braking scenarios. In addition, trace 18 indicates the application and removal of brakes from the driver's perspective. Those skilled in the art will appreciate that the actual application of braking forces to vehicle 10 may be pulsed or otherwise varied in accordance with automatic braking systems while brakes are applied as indicated in trace 18.

As shown in a trace 20, lower brake lights 14–16 are continuously activated in accordance with the application of vehicle brakes. Specifically, both of lower lights 14–16 are activated at time $T_1$ and remain continuously activated until time $T_8$. At time $T_8$ lights 14–16 are deactivated. Thus, whenever vehicle brakes are applied, lower lights 14–16 are activated. Whenever vehicle brakes are not applied lower lights 14–16 are not activated, turn indications notwithstanding.

A trace 22 illustrates the operation of CHMSL 12. CHMSL 12 operates in a different manner than lower lights 14–16. Whenever vehicle brakes are not applied, CHMSL 12 is deactivated. This feature of operation is identical for all of lights 12–16. However, when vehicle brakes are initially applied, as shown at time $T_1$, CHMSL 12 begins operation in a flashing mode. In particular, CHMSL 12 is activated from time $T_1$ to a time $T_2$, deactivated from time $T_2$ to a time $T_3$, and so on for a predetermined duration, which trace 22 indicates as expiring at a time $T_6$. In the preferred embodiment of the present invention, this predetermined duration is in the range of 1.5–4 seconds, and more preferably in the range of 2–3 seconds. The rate of flashing is preferably greater than two flashes per second, and more preferably greater than three flashes per second. After time $T_6$, CHMSL 12 remains continuously activated until vehicle brakes are removed at time $T_8$.

The duration of the flashing mode of operation (between times $T_1$ and $T_6$) accomplishes two goals. First, this duration is preferably relatively short when compared to an average application of brakes. By keeping this duration to less than four seconds, the quantity of flashing rear lights experienced by drivers in traffic is held to a low level and excessive flashing is avoided. Consequently, drivers tend not to become immune to the attention-grabbing effect of a flashing light, and no significant reduction occurs in the attention-grabbing effect of non-flashing brake lights used by other vehicles. In accordance with a second goal, this duration is preferably long enough so that a significantly greater attention-grabbing effect will result than is achieved from a non-flashing light. Hence, improved safety and a reduced likelihood of rear-end collisions may be expected from operating CHMSL 12 in its flashing mode.

The rate of flashing is established so that a distinctive flashing signature results. Typical vehicle flashers cause turn signals and emergency lights to flash at a rate of around 0.75–3.0 times per second, with most flashing at a rate of around 1–2 times per second. Preferably, CHMSL 12 flashes at a rate faster than most turn signals and emergency lights to give a distinctive appearance and a heightened attention-grabbing effect. A heightened attention-grabbing effect results because the faster flashing rate achieves more flashes within the duration of the flashing mode of operation.

While CHMSL 12 operates in its flashing mode, lower lights 14–16 are continuously activated. This feature of the present invention achieves two goals. First, it allows the flashing light operation of the present invention to have a more subtle effect than would result if all of lights 12–14 were flashing. The flashing of CHMSL 12 is balanced by the constancy of lower lights 14–16. Thus, the flashing of CHMSL 12 enhances the attention-grabbing effect, but the overall effect when combined with lower lights 14–16 avoids excessive flashing and excessive distraction of drivers.

The second goal achieved by operating CHMSL 12 in a flashing mode while constantly activating lower lights 14–16 concerns failure modes. The present invention employs a circuit, discussed below in connection with FIG. 3, to cause CHMSL 12 to behave as indicated in trace 22 of FIG. 2. No circuit beyond those employed in normal, non-flashing brake light systems is used in connection with lower lights 14–16. Accordingly, a failure in the flashing circuit, which is highly unlikely for reasons discussed below, will not affect operation of lower lights 14–16. As a result, a total brake light failure is virtually impossible from operating the flashing circuit, and failure modes of the present invention do not negatively impact safety in a significant way.

Of course, those skilled in the art will appreciate that brakes may be removed prior to time $T_8$. FIG. 2 depicts this situation in a trace 18'. In particular, brakes may be removed at a time $T_4$, which occurs prior to time $T_6$. When brakes are removed after an intermediate duration, which transpires before the flashing mode expires, CHMSL 12 goes inactive until brakes are reapplied, as shown in trace 22'. FIG. 2 depicts the reapplication of brakes in trace 18' at a time $T_5$. Upon reapplication of the brakes, CHMSL 12 again enters its flashing mode. However, this time, the flashing mode does not continue for its normal duration but continues only for the remainder of the flashing mode duration from the previous application of the brakes, as indicated by dotted lines in FIG. 2. After this shortened flashing mode, CHMSL 12 remains continuously activated until brakes are removed, as indicated at a time $T_9$ in traces 18' and 22'.

The conservation of the flashing mode period between successive application of brakes is desirable because it prevents any inadvertent driver "pumping" of brakes from continuously flashing CHMSL 12. The prevention of continuous flashing is desirable because it reduces the likelihood of excessive flashing. In the preferred embodiment of the present invention, the flashing mode period is conserved for a duration of at least 8 seconds and less than 24 seconds after the removal of brakes. In other words, if brakes are reapplied within 8 seconds of their removal, the flashing mode period is conserved and CHMSL 12 flashes for approximately the remaining duration of its previous flashing mode. On the other hand, if brakes are reapplied more than approximately 24 seconds after they were previously removed, CHMSL 12 will cycle through the complete duration of its flashing mode.

Figure 3:
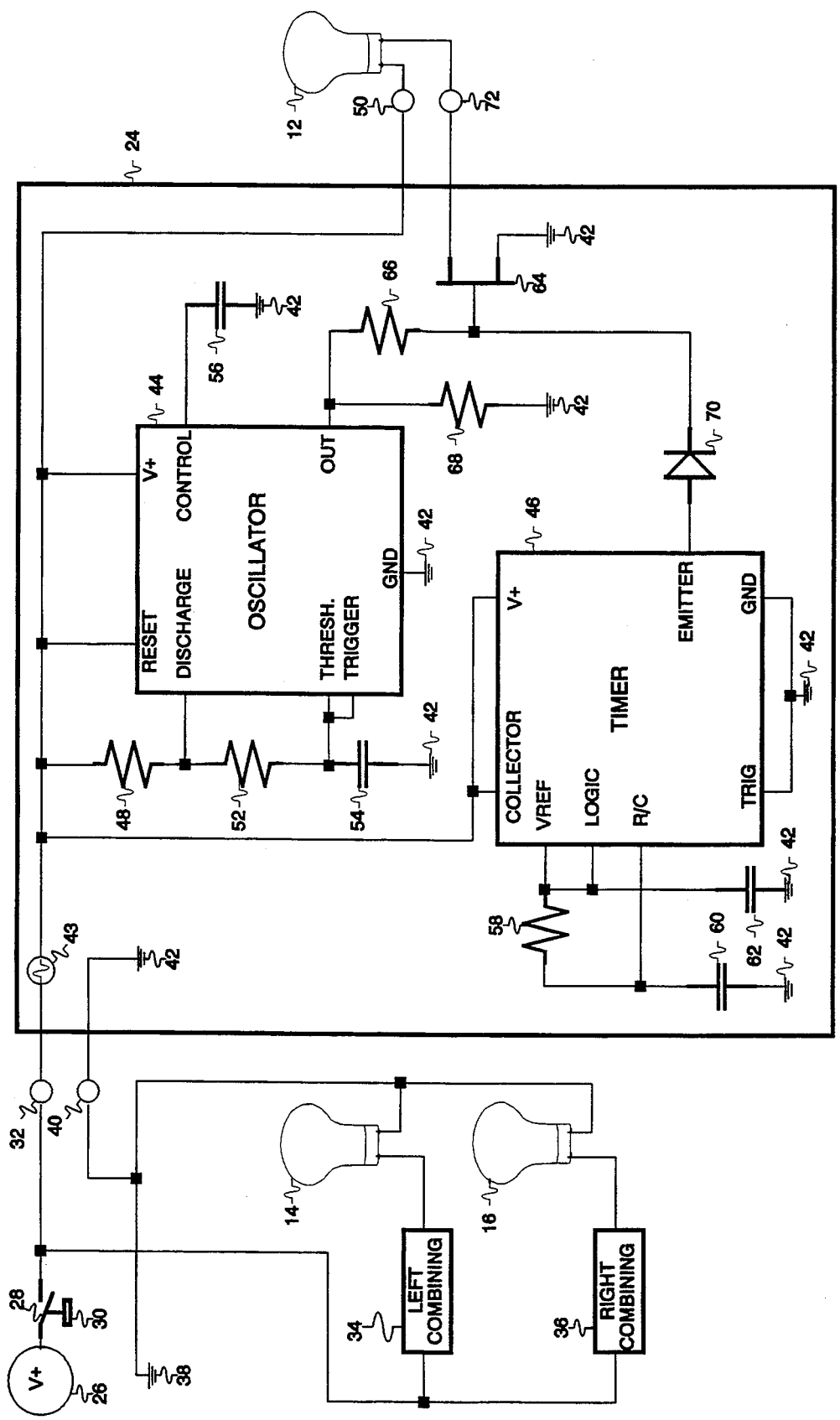
FIG. 3 shows a schematic block diagram of components used in accordance with the present invention.

FIG. 3 shows a schematic block diagram of a circuit 24 which causes CHMSL 12 to operate as indicated in trace 22 of FIG. 2. Circuit 24 is preferably inserted in series with conductors that drive CHMSL 12 in accordance with a normal non-flashing brake light system.

As is conventional, in vehicle 10 (see FIG. 1) a voltage source 26 applies a supply voltage to a first node of a brake switch 28. Brake switch 28 is operated by a brake pedal 30 of vehicle 10. A second node of switch 28 couples to a supply node 32 of circuit 24 and to first nodes of left and right combining circuits 34 and 36, respectively. Combining circuits 34–36 combine the brake signal with turn signal circuits (not shown) so that left and right lower lights 14–16 indicate both turning and braking for vehicle 10. Second nodes of circuits 34 and 36 couple to first nodes of left and right lower rear lights 14 and 16, respectively. A ground terminal 38, which is adapted to receive a common potential, couples to a ground node 40 of circuit 24 and to second nodes of lights 14–16.

With reference to circuit 24, ground node 40 couples to a ground terminal 42 of circuit 24. Supply node 32 couples, preferably through a fusible link 43, to a V+ input power terminal of a semiconductor oscillator device 44, such as an LM555 manufactured by the National Semiconductor Company, and to a V+ input power terminal of a semiconductor timer device 46, such as an LM2905 also manufactured by National Semiconductor. Ground terminals of oscillator 44 and of timer 46 couple to ground terminal 42. Accordingly, devices 44–46 are energized when brakes are applied through the operation of brake pedal 30 and are de-energized when brakes are removed. Fusible link 43 prevents potential high-current failures of circuit 24 from propagating back toward lower lights 14–16.

Supply node 32 additionally couples to a reset input of oscillator 44, a first node of a resistor 48, a collector terminal of timer 46, and an output supply node 50 of circuit 24. A second node of resistor 48 couples to a discharge terminal of oscillator 44 and to a first node of a resistor 52. A second node of resistor 52 couples to threshold and trigger inputs of oscillator 44 and to a first node of a capacitor 54. A second node of capacitor 54 couples to ground terminal 42, and a control terminal of oscillator 44 couples to ground terminal 42 through a capacitor 56.

A reference voltage output of timer 46 couples to a first node of a resistor 58 and to a logic input of timer 46. A second node of resistor 58 couples to an R/C input of timer 46 and to a first node of a capacitor 60. A second node of capacitor 60 couples to ground terminal 42. A trigger input of timer 46 couples to ground terminal 42. A capacitor 62 is coupled between the reference voltage output of timer 46 and ground terminal 42.

An output terminal of oscillator 44 couples to a gate of a semiconductor switch 64, such as a MTP12N05 power MOSFET manufactured by the Motorola Corporation, through a current limiting resistor 66. A load resistor 68 couples between the output terminal of oscillator 44 and ground terminal 42. An emitter terminal of timer 46 provides an output signal and couples to an anode of a steering diode 70. A cathode of diode 70 also couples to the gate of switch 64. A drain of switch 64 couples to a return node 72 of circuit 24, and a source of switch 64 couples to ground terminal 42. Switch 64 is preferably mounted on a heat sink.

Output supply node 50 of circuit 24 couples to a first node of CHMSL 12, and return node 72 of circuit 24 couples to a second node of CHMSL 12. Accordingly, circuit 24 includes two input nodes 32 and 40 and two output nodes 50 and 72. Circuit 24 couples in series with the signal and ground signals that drive a conventional non-flashing CHMSL.

The connections of oscillator 44 along with components 48, 52, 54, 56, 66, and 68 cause oscillator 44 to operate in an astable mode. In other words, when oscillator 44 is energized through the application of brakes, oscillator 44 generates a free-running oscillating signal at its output terminal. FIG. 2 depicts this signal at a trace 74 thereof. Of course, no oscillation signal is produced when brakes have been removed and oscillator 44 is de-energized. The frequency and pulse width of the oscillating signal is controlled through resistors 48 and 52 in connection with capacitor 54. The oscillating signal preferably activates at a rate in excess of two flashes per second, and more preferably in excess of three flashes per second. When this oscillating signal is active, switch 64 switches on, and light 12 activates. So long as a signal output by timer 46 is not also active, light 12 flashes in response to activations of the oscillation signal.

The connections of timer 46 along with components 58, 60, and 62 cause timer 46 to time-out upon powering up. The duration of the time-out period is controlled by resistor 58 and capacitor 60. In the preferred embodiment of the present invention, this time-out duration is in the range of 1.5–4 seconds, and more preferably in the range of 2–3 seconds. FIG. 2 shows a trace 76 which depicts the output signal supplied at the emitter terminal of timer 46. This timer output signal is inactive whenever timer 46 is de-energized and whenever it has just been energized but the time-out period has not yet transpired. When inactive, the timer output signal has no influence over the operation of CHMSL 12. However, whenever, the timer output signal is active, switch 64 switches on and CHMSL 12 is activated. It is the combination of the timer output signal with the oscillating signal output from oscillator 44 that causes light 12 to act as shown in traces 22 and 22' of FIG. 2.

Upon energizing timer 46, capacitor 60 charges at a rate controlled by the values of resistor 58 and capacitor 60. The output signal of timer 46 activates when the voltage at its R/C input reaches a predetermined threshold and remains activated until timer 46 becomes de-energized. In the preferred embodiment of the present invention, a path internal to timer 46 is provided for quickly discharging capacitor 60 when timer 46 activates. However, no path is provided for quickly discharging capacitor 60 when timer 46 de-energizes. Consequently, upon de-energizing timer 46, capacitor 60 discharges slowly through timer 46 and resistor 58.

When timer 46 becomes de-energized before going active, as indicated at time $T_4$ by the application of brakes in trace 18' of FIG. 2, capacitor 60 discharges at a slow rate through timer 46 and resistor 58. If timer 46 does not become energized within a relatively long period of time, for example, 24 seconds, then capacitor 60 holds little or no charge. If brakes are reapplied only after this relatively long period of time, capacitor 60 begins charging from a state of substantially no charge stored therein. On the other hand, if timer 46 becomes re-energized quickly (within 8 seconds for example), as shown at time T₅ in trace 18', capacitor 60 has discharged only an insubstantial amount, and begins adding to the charge previously accumulated therein. The resulting period of time until timer 46 activates is less than the normal flashing mode duration, and preferably approximately the remaining duration from the previous flashing mode.

The prevention of a re-initialized flashing mode upon the quick reapplication of brakes is advantageous because it prevents excessive flashing in situations where brakes are inadvertently being pumped, as occasionally occurs when vehicles are stopped in traffic. On the other hand, if the brakes have been applied sufficiently long so that timer 46 has activated and caused CHMSL 12 to become continuously lit, a quickly re-initialized flashing mode results. The quickly re-initialized flashing mode in this situation is an advantageous driver convenience because, in situations where flashing lights are desired, the flashing task is performed automatically by circuit 24.

The reliability of circuit 24 is extremely high. The high reliability results from its simplicity and the use of semiconductor parts rather than mechanical devices. The only active component of circuit 24 which conducts large current is switch 64. Switch 64 is preferably mounted on a heat sink so that it operates relatively coolly and can be expected to have a long life. However, in the unlikely event that switch 64 fails, its most common failure mode is a short between the source and drain. Consequently, in all likelihood, should a failure occur in connection with circuit 24, the failure will cause light 12 to operate as a conventional non-flashing brake light. The simplicity of circuit 24 also allows circuit 24 to be manufactured and sold inexpensively. It can be easily installed in vehicles having non-flashing brake lights because its simplicity allows it to occupy an extremely small space and because it requires only the signals which a non-flashing brake light system provides to a CHMSL.

In summary, the present invention provides an improved flashing brake light system. A vehicle's brake lights are flashed in a subtle manner. In particular, only the upper brake light is flashed. It is flashed only for a short period of time, after which it is constantly activated. The lower brake lights do not flash, and if brakes are quickly reapplied after being removed, no automatic flashing occurs. The flashing of brake lights produces an improved attention-grabbing effect. The subtle manner in which the present invention flashes brake lights reduces drivers' immunity to the flashing effect and drivers' immunity to non-flashing brake light systems. The present invention employs a circuit which is highly reliable due to its reliance upon semiconductor components rather than mechanical devices. Moreover, the present invention is configured so that in the unlikely event that a failure occurs, the failure will not produce a dangerous condition since, at a minimum, lower brake lights remain operational, and most probably even the CHMSL remains operational in a non-flashing mode. Further, the present invention relies upon an inexpensive circuit that is easily installed in existing vehicles having non-flashing brake light systems.

The present invention has been described above with reference to a preferred embodiment. However, those skilled in the art will recognize that changes and modifications may be made in this preferred embodiment without departing from the scope of the present invention. For example, those skilled in the art may adapt components other than those mentioned herein to achieve the functions discussed herein. These and other changes and modifications which are obvious to those skilled in the art are intended to be included within the scope of the present invention.

What is claimed is:

1. An apparatus for indicating the braking status of a vehicle upon the activation of an input signal, said apparatus comprising:
   a semiconductor oscillator circuit having a power terminal adapted to be energized by said input signal and being configured to generate an oscillation signal alternatively exhibiting activated and inactivated states so long as said oscillator circuit is energized;
   a semiconductor timer circuit having a power terminal adapted to be energized by said input signal, being configured to generate a delay signal which becomes activated a predetermined duration after said activation of said input signal, and being configured so that, when said input signal is inactivated prior to expiration of said predetermined duration and then reactivated, said delay signal becomes activated a remaining duration after said reactivation, said remaining duration being less than said predetermined duration; and
   a semiconductor switch coupled to said oscillator circuit and to said timer circuit, said switch being configured to switch on when any one of said oscillation and delay signals is activated.

2. An apparatus as claimed in claim 1 wherein said timer circuit is configured so that:
   when said reactivation of said input signal occurs less than approximately 8 seconds following said inactivation, said delay signal becomes activated upon expiration of said remaining duration; and
   when said reactivation of said input signal occurs more than approximately 24 seconds following said inactivation, said delay signal becomes activated upon expiration of said predetermined duration.

3. An apparatus for indicating the braking status of a vehicle upon the activation of an input signal, said apparatus comprising:
   a semiconductor oscillator circuit having a power terminal adapted to be energized by said input signal and being configured to generate an oscillation signal alternatively exhibiting activated and inactivated states so long as said oscillator circuit is energized;
   a semiconductor timer circuit having a power terminal adapted to be energized by said input signal, being configured to generate a delay signal which becomes activated a predetermined duration after said activation of said input signal, and being configured so that, when said input signal is inactivated after said predetermined duration and then immediately reactivated, said delay signal becomes activated substantially upon expiration of said predetermined duration after said reactivation; and
   a semiconductor switch coupled to said oscillator circuit and to said timer circuit, said switch being configured to switch on when any one of said oscillation and delay signals is activated.

4. In a vehicle having an upper light and lower lights viewable from behind said vehicle, said upper and lower lights serving as indicators for braking, a method of operating said upper and lower lights comprising the steps of:

continuously activating said lower lights upon the application of vehicle brakes;

initiating a flashing mode of operating said upper light upon the application of said vehicle brakes;

waiting a predetermined duration; and continuously activating said upper light after said predetermined duration when said vehicle brakes remain applied;

deactivating said upper and lower lights upon removal of said brakes re-initiating said flashing mode of operating said upper light upon the reapplication of said brakes after said deactivating step;

continuing said flashing mode for a remaining duration when said deactivating step occurred during said waiting step, said remaining duration being less than said predetermined duration, then repeating said continuously activating step; and continuing said flashing mode for said predetermined duration when said deactivating step occurred during said continuously activation step.

5. An apparatus for indicating the braking status of a vehicle upon the activation of an input signal, said apparatus comprising:

a signal terminal adapted to receive said input signal;

a semiconductor oscillator circuit having a power terminal coupled to said signal terminal and being configured to generate an oscillation signal alternatively exhibiting activated and inactivated states upon said activation of said input signal;

a semiconductor timer circuit having a power terminal coupled to said signal terminal, said timer circuit being configured so that:

a delay signal which becomes activated a predetermined duration after said activation of said input signal is generated, when said input signal is inactivated after an intermediate duration which is less than said predetermined duration and then reactivated, said delay signal becomes activated for a remaining duration after said reactivation, said remaining duration being substantially equivalent to said predetermined duration minus said intermediate duration, and when said input signal is inactivated after said predetermined duration and then immediately reactivated, said delay signal becomes activated after said reactivation substantially upon expiration of said predetermined duration;

a semiconductor switch coupled to said oscillator circuit and to said timer circuit, said switch being configured to switch on when any one of said oscillation and delay signals is activated;

an upper light coupled to said switch so that said upper light is activated whenever said switch switches on; and lower lights coupled to said signal terminal so that so that said lower lights are activated whenever said input signal is activated.

6. An apparatus for indicating the braking status of a vehicle as claimed in claim 5 wherein said timer circuit is configured so that said predetermined duration is less than three seconds.

7. An apparatus for indicating the braking status of a vehicle as claimed in claim 6 wherein said oscillator circuit is configured so that said oscillation signal exhibits its activated state at least three times a second.

* * * * *